(12) United States Patent
Tanaka et al.

(10) Patent No.: US 7,147,540 B2
(45) Date of Patent: Dec. 12, 2006

(54) MAGNETIC HEAD SLIDER AND METHOD OF MANUFACTURING THE SAME

(75) Inventors: Hideaki Tanaka, Yokohama (JP); Kenji Furusawa, Hiratsuka (JP); Takateru Seki, Yokohama (JP); Akio Takakura, Odawara (JP); Yukihiro Isono, Hadano (JP)

(73) Assignee: Hitachi Global Storage Technologies Japan Ltd., Odawara (JP)

( * ) Notice: Subject to any disclaimer, the term of this patent is extended or adjusted under 35 U.S.C. 154(b) by 427 days.

(21) Appl. No.: 10/384,310

(22) Filed: Mar. 6, 2003

(65) Prior Publication Data

Related U.S. Application Data

(63) Continuation-in-part of application No. 10/024,962, filed on Dec. 18, 2001, now Pat. No. 6,881,124.

(30) Foreign Application Priority Data

| Mar. 8, 2001 | (JP) | ............................. 2001-064338 |
| Aug. 2, 2001 | (JP) | ............................. 2001-234358 |
| Mar. 6, 2002 | (JP) | ............................. 2002-059668 |

(51) Int. Cl.
*B24B 49/10* (2006.01)
(52) U.S. Cl. ........................... 451/5; 451/28; 29/603.16
(58) Field of Classification Search ................... 451/5, 451/8, 10, 28, 57, 58; 29/603.12, 603.15, 29/603.16

See application file for complete search history.

(56) References Cited

U.S. PATENT DOCUMENTS 5,749,769 A * 5/1998 Church et al. ................. 451/5

FOREIGN PATENT DOCUMENTS

| JP | 02-095572 | 4/1990 |
| JP | 2000-158335 | 6/2000 |

OTHER PUBLICATIONS

U.S Appl. No. 10/024,962, filed Sep. 12, 2002, Toshio Takahashi et al.

* cited by examiner

*Primary Examiner*—Robert A. Rose
(74) *Attorney, Agent, or Firm*—Townsend and Townsend and Crew LLP

(57) ABSTRACT

In order to realize a shape of an air bearing surface of a magnetic head slider which is capable of coping with a lowering of flying height and which has high reliability, at the time of polishing the air bearing surface of the magnetic head slider by bringing the air bearing surface and the surface of a polishing machine into contact with each other, machining is conducted in the condition where the stiffness acting between both the members is enhanced, and the standard deviation of the flatness of the air bearing surface machined and the standard deviation of the recess amount between the air bearing surface and a magnetic element are controlled. Thus, it is possible to efficiently manufacture a magnetic head slider which enables driving at a low flying height.

4 Claims, 9 Drawing Sheets

A-A' SECTIONAL VIEW

B-B' SECTIONAL VIEW

FIG. 10

| | FLATNESS DISPERSION $X_2$ | RECESS AMOUNT $X_1$ | $X_2^2$ | $X_1^2$ | $X_1 X_2$ |
|---|---|---|---|---|---|
| 1 | 0.17 | 0.93 | 0.03 | 0.87 | 0.16 |
| 2 | −0.68 | 1.25 | 0.46 | 1.56 | −0.85 |
| 3 | −0.95 | 1.22 | 0.90 | 1.49 | −1.16 |
| 4 | −0.64 | 0.71 | 0.41 | 0.50 | −0.45 |
| 5 | −0.46 | 0.86 | 0.21 | 0.73 | −0.39 |
| 6 | 0.22 | 1.29 | 0.05 | 1.66 | 0.28 |
| 7 | 0.81 | 0.90 | 0.66 | 0.80 | 0.72 |
| 8 | 0.46 | 1.68 | 0.21 | 2.82 | 0.77 |
| 9 | −0.09 | 1.83 | 0.01 | 3.34 | −0.17 |
| 10 | −0.24 | 1.12 | 0.06 | 1.25 | −0.27 |
| 11 | −0.15 | 1.89 | 0.02 | 3.58 | −0.28 |
| 12 | 0.20 | 1.33 | 0.04 | 1.77 | 0.27 |
| 13 | 0.24 | 1.87 | 0.06 | 3.51 | 0.45 |
| 14 | 0.53 | 1.53 | 0.28 | 2.33 | 0.81 |
| 15 | −0.33 | 2.57 | 0.11 | 6.59 | −0.85 |
| 16 | 0.45 | 2.25 | 0.20 | 5.06 | 1.01 |
| 17 | 0.43 | 1.84 | 0.18 | 3.40 | 0.79 |
| 18 | −0.63 | 2.06 | 0.40 | 4.23 | −1.30 |
| 19 | −0.68 | 1.52 | 0.46 | 2.32 | −1.04 |
| 20 | 0.30 | 1.83 | 0.09 | 3.34 | 0.55 |
| STANDARD DEVIATION | 0.50 | 0.50 | | | |
| TOTAL Σ | −1.1 | 30.5 | 4.8 | 51.1 | −0.95 |

FIG. 11

| | FLATNESS DISPERSION $X_4$ | RECESS AMOUNT $X_3$ | $X_4^2$ | $X_3^2$ | $X_3 X_4$ |
|---|---|---|---|---|---|
| 1 | −0.52 | 2.59 | 0.28 | 6.73 | −1.36 |
| 2 | −0.67 | 2.98 | 0.46 | 8.86 | −2.01 |
| 3 | −0.19 | 2.38 | 0.04 | 5.64 | −0.46 |
| 4 | 1.22 | 4.13 | 1.48 | 17.08 | 5.02 |
| 5 | 2.57 | 2.28 | 6.58 | 5.19 | 5.84 |
| 6 | 2.84 | 3.09 | 8.04 | 9.52 | 8.75 |
| 7 | 2.01 | 1.41 | 4.02 | 1.99 | 2.83 |
| 8 | 1.05 | 2.27 | 1.09 | 5.13 | 2.37 |
| 9 | 0.00 | 1.94 | 0.00 | 3.77 | −0.01 |
| 10 | −0.93 | 2.58 | 0.87 | 6.65 | −2.41 |
| 11 | −0.98 | 2.30 | 0.97 | 5.31 | −2.27 |
| 12 | −0.72 | 3.17 | 0.53 | 10.02 | −2.29 |
| 13 | −1.61 | 3.22 | 2.61 | 10.37 | −5.20 |
| 14 | −0.23 | 2.68 | 0.06 | 7.19 | −0.63 |
| 15 | 0.30 | 3.92 | 0.09 | 15.34 | 1.16 |
| 16 | 1.63 | 3.40 | 2.64 | 11.56 | 5.53 |
| 17 | 0.82 | 2.56 | 0.66 | 6.55 | 2.09 |
| 18 | −0.41 | 2.91 | 0.17 | 8.46 | −1.21 |
| 19 | −1.73 | 2.31 | 3.01 | 5.32 | −4.00 |
| 20 | −2.23 | 2.95 | 4.99 | 8.67 | −6.58 |
| STANDARD DEVIATION | 1.42 | 0.64 | | | |
| TOTAL Σ | 2.1 | 55.1 | 38.6 | 159.4 | 5.15 |

FIG. 12

| | FLATNESS DISPERSION $K_2$| | RECESS AMOUNT $X_1$ | $X_2^2$ | $X_1^2$ | $X_2 K_2$| |
|---|---|---|---|---|---|
| 1 | 0.17 | 0.93 | 0.03 | 0.87 | 0.16 |
| 2 | 0.68 | 1.25 | 0.46 | 1.56 | 0.85 |
| 3 | 0.95 | 1.22 | 0.90 | 1.49 | 1.16 |
| 4 | 0.64 | 0.71 | 0.41 | 0.50 | 0.45 |
| 5 | 0.46 | 0.86 | 0.21 | 0.73 | 0.39 |
| 6 | 0.22 | 1.29 | 0.05 | 1.66 | 0.28 |
| 7 | 0.81 | 0.90 | 0.66 | 0.80 | 0.72 |
| 8 | 0.46 | 1.68 | 0.21 | 2.82 | 0.77 |
| 9 | 0.09 | 1.83 | 0.01 | 3.34 | 0.17 |
| 10 | 0.24 | 1.12 | 0.06 | 1.25 | 0.27 |
| 11 | 0.15 | 1.89 | 0.02 | 3.58 | 0.28 |
| 12 | 0.20 | 1.33 | 0.04 | 1.77 | 0.27 |
| 13 | 0.24 | 1.87 | 0.06 | 3.51 | 0.45 |
| 14 | 0.53 | 1.53 | 0.28 | 2.33 | 0.81 |
| 15 | 0.33 | 2.57 | 0.11 | 6.59 | 0.85 |
| 16 | 0.45 | 2.25 | 0.20 | 5.06 | 1.01 |
| 17 | 0.43 | 1.84 | 0.18 | 3.40 | 0.79 |
| 18 | 0.63 | 2.06 | 0.40 | 4.23 | 1.30 |
| 19 | 0.68 | 1.52 | 0.46 | 2.32 | 1.04 |
| 20 | 0.30 | 1.83 | 0.09 | 3.34 | 0.55 |
| STANDARD DEVIATION | 0.24 | 0.50 | | | |
| TOTAL $\Sigma$ | 8.7 | 30.5 | 4.8 | 51.1 | 12.6 |

FIG. 13

| | FLATNESS DISPERSION $K_4$ | RECESS AMOUNT $X_3$ | $X_4^2$ | $X_3^2$ | $X_3 K_4$ |
|---|---|---|---|---|---|
| 1 | 0.52 | 2.59 | 0.28 | 6.73 | 1.36 |
| 2 | 0.67 | 2.98 | 0.46 | 8.86 | 2.01 |
| 3 | 0.19 | 2.38 | 0.04 | 5.64 | 0.46 |
| 4 | 1.22 | 4.13 | 1.48 | 17.08 | 5.02 |
| 5 | 2.57 | 2.28 | 6.58 | 5.19 | 5.84 |
| 6 | 2.84 | 3.09 | 8.04 | 9.52 | 8.75 |
| 7 | 2.01 | 1.41 | 4.02 | 1.99 | 2.83 |
| 8 | 1.05 | 2.27 | 1.09 | 5.13 | 2.37 |
| 9 | 0.00 | 1.94 | 0.00 | 3.77 | 0.01 |
| 10 | 0.93 | 2.58 | 0.87 | 6.65 | 2.41 |
| 11 | 0.98 | 2.30 | 0.97 | 5.31 | 2.27 |
| 12 | 0.72 | 3.17 | 0.53 | 10.02 | 2.29 |
| 13 | 1.61 | 3.22 | 2.61 | 10.37 | 5.20 |
| 14 | 0.23 | 2.68 | 0.06 | 7.19 | 0.63 |
| 15 | 0.30 | 3.92 | 0.09 | 15.34 | 1.16 |
| 16 | 1.63 | 3.40 | 2.64 | 11.56 | 5.53 |
| 17 | 0.82 | 2.56 | 0.66 | 6.55 | 2.09 |
| 18 | 0.41 | 2.91 | 0.17 | 8.46 | 1.21 |
| 19 | 1.73 | 2.31 | 3.01 | 5.32 | 4.00 |
| 20 | 2.23 | 2.95 | 4.99 | 8.67 | 6.58 |
| STANDARD DEVIATION | 0.82 | 0.64 | | | |
| TOTAL $\Sigma$ | 22.7 | 55.1 | 38.6 | 159.4 | 62.0 |

MAGNETIC HEAD SLIDER AND METHOD OF MANUFACTURING THE SAME

BACKGROUND OF THE INVENTION

The present invention relates to a magnetic head slider for recording and reading back information onto and from recording media such as magnetic recording disks with the magnetic head being moved relatively to the recording media.

In recent years, it has been required to reduce the flying height of the magnetic head relative to the magnetic recording medium to 10 nm or less as the magnetic recording disk drives have remarkably been enhanced in recording density.

Generally, a magnetic recording disk drive is composed by combining a magnetic head fixed to a support spring with a magnetic recording disk which is a recording medium. The writing and reading of magnetic records onto and from the magnetic recording disk being rotated is carried out by the magnetic head which is moved relative to the magnetic recording disk by a head access system. Therefore, the unit length per bit is reduced as the plane recording density of the magnetic recording disk is enhanced; viewing from the magnetic head side, this means that it is required to achieve a lower flying height and thereby to read the leakage field efficiently.

In view of the performance of the magnetic head, it is necessary to set the flying height at about 10 nm in the case of a recording density of 100 Gb/in$^2$, and, particularly, the variation of the air bearing surface shape is an obstacle in realizing the above-mentioned flying height. Further, for the purpose of efficient reading of the leakage field, a lower flying height is required at the portion corresponding to the recess amount $X_1$ between a slider substrate and a read element (magnetic head element) disposed via a shield element, since the effective head reading performance is deteriorated if the recess amount $X_1$ is large.

A method of producing the air bearing surface of the magnetic head with such a low flying height generally employs polishing. In particular, if a magnetoresistive (MR) or giant magnetoresistive (GMR) head is used for reading the information from the magnetic recording disks, the element height of the MR or GMR element must be machined with high accuracy. Specific processing methods are described in detail in Japanese Patent Laid-open No. Hei 2-95572 and Japanese Patent Laid-open No. 2000-158335.

SUMMARY OF THE INVENTION

The above-mentioned processing methods employ a lapping method for polishing on a soft metal-based surface plate. Specifically, while a lapping liquid mainly containing hard abrasive grains of diamond or the like is dripped through a slurry supply tube onto a soft metal-made polishing surface plate being rotated, a head adhered to a polishing jig is slid under pressure, whereby processing is conducted by the abrasive grains embedded in the polishing surface plate or by rolling abrasive grains rolling between the surface plate and the head.

However, in the above-mentioned polishing process by use of a computer lapping, processing on the order of about several µm is conducted, and, therefore, it is indispensable to continuously drip the slurry containing free abrasive grains from the viewpoint of enhancement of processing efficiency with respect to throughput. Specifically, from the start of processing to a point of about 1 µm before the target size, the dripping of free abrasive grains is continued, whereby the polishing process is performed at a processing rate of about 1 µm/min. Next, the dripping of free abrasive grains is stopped, dripping of only a lubricating oil is conducted instead and, further, the relative velocity between the workpiece and the surface plate is reduced to a value of 1/n (n is a number corresponding to the term "several") of the preceding value, whereby finish processing is conducted at a low processing rate of not more than 0.1 µm/min. In this manner, the desired accuracy of the element height is obtained.

In this case, a contrivance has been attempted in which, for example, the free abrasive grains remaining on the surface plate are wiped off immediately before the transition from the rough machining using the free abrasive grains to the finish machining using the dripping of only the lubricating oil. However, since the processing or machining is conducted continuously on the same surface plate, it is difficult to transit to the finish machining by completely removing the free abrasive grains. Therefore, the use of only this step has a limitation as to the reduction of the selective polishing of soft portions due to the action of the free abrasive grains, i.e., dents in the element, or the so-called recess amount, and the variation of flatness of the air bearing surface produced by the machining is large.

One of the reasons for this resides in that the members constituting the magnetic head slider which differ in hardness and arranged in a stack form as a whole, such as a slider substrate (aluminum titanium carbide or the like), an insulating film (alumina), a shield portion (permalloy) and the magnetic head element (magnetic material) are simultaneously subjected to the polishing. Incidentally, the hardness of the slider substrate is higher than that of the insulating film, the hardness of the insulating film is higher than that of the shield portion or the magnetic head element, and thus, the successful polishing is difficult.

In such a prior art in which the finish polishing as a separate step is conducted, it is often the practice to slidingly move the workpiece holding jig mounted with a row bar in random directions relative to the surface plate so as to contrive a reduction in the surface roughness of the work surface as a whole. In addition, in the apparatus for such finish machining, the workpiece holding jig is frequently so constructed that it can be freely oscillated relative to the support mechanism.

That is to say, after the parallelism between the workpiece surface of the workpiece and the polishing surface of the surface plate is adjusted, the work holding jig is pressed from the upper side, and thereafter the work holding jig is forced to swing in the radial direction of the surface plate, whereby polishing process by relative sliding motions in conjunction with the rotating motion of the surface plate is carried out.

In this case, the support mechanism for exerting a pressing load on the work holding jig is so designed as to maintain the parallelism between the workpiece surface of the workpiece and the polishing surface of the surface plate through spontaneous self-adjustment by the free oscillating mechanism, even when the orientation of the longitudinal axis of the support mechanism and the orientation of the normal axis of the polishing surface of the surface plate are staggered from each other at the stage before the contact between the workpiece and the surface plate.

In this type of machining, the work holding jig and the support mechanism are connected through the free oscillating mechanism. Therefore, at the time of inversion of the swing of the work, the frictional force in the shearing direction exerted on the workpiece surface to be polished of the workpiece is also inverted. For this reason, the distribution of the polishing load exerted on the work during machining becomes nonuniform and instable in the bar, with the result that the flatness and the recess amount of the air bearing surface in the bar are also nonuniform and instable.

In view of the performance of a magnetic head, it is an object of the present invention to provide an air bearing surface shape, and a method of producing the air bearing surface, which maintains such a high reliability as to be free of the fear of head crash even in the case of a flying height of about 10 nm for high recording density, and in which a recess amount X1 between a slider substrate and a read element disposed via a shield portion is small, and a reading resolution in head leakage magnetic field is high.

In order to attain the above object, according to the present invention, there is provided a magnetic head slider which includes in a group of magnetic head sliders, each having a shape of an air bearing surface formed on a slider substrate, such that the standard deviation of the group for recess amount between the air bearing surface and the surface of a magnetic head element that is disposed on the slider substrate with an insulating film and a shield portion interposed therebetween is not more than 0.8 nm, and, as will be described later, in the shape of the air bearing surface of the head slider shown in FIG. 3, particularly the standard deviation of the group for dispersion of the flatness in the direction of section A–A' is not more than 0.6 nm.

In order to attain the above object, according to the present invention, there is also provided a magnetic head slider which includes in the group of magnetic head sliders having the air bearing surfaces which are judged, within the range of a level of significance of 5%, to be not significantly different from the group of the magnetic head sliders such characteristics that the total $\Sigma X_1$ of recess amounts $X_1$ is 30.5 nm, the total $\Sigma X_1^2$ of squares of the recess amounts $X_1$ is 51.1 nm$^2$, the total $\Sigma X_2$ of dispersion $X_2$ of surface flatness of the air bearing surface is –1 nm, the total $\Sigma X_2^2$ of squares of the dispersion $X_2$ of the surface flatness is 4.8 nm$^2$, and the total $\Sigma X_1 X_2$ of the products of the recess amount $X_1$ and the surface flatness dispersion $X_2$ of the air bearing surface is –0.95 nm$^2$, when subjected to F-test on a Wilks' $\Lambda$ obtained from the group of the magnetic head sliders having the air bearing surfaces having the characteristics.

In order to attain the above object, according to the present invention, there is further provided a magnetic head slider which includes in the group of the magnetic head sliders having the air bearing surfaces which are decided, within the range of a level of significance of 5%, to be not significantly different from a magnetic head slider group having air bearing surfaces having such characteristics that the total $\Sigma X_1$ of recess amounts $X_1$ is 30.5 nm, the total $\Sigma X_1^2$ of squares of the recess amounts $X_1$ is 51.1 nm$^2$, the total $\Sigma |X_2|$ of the absolute values of dispersion $X_2$ of surface flatness of the air bearing surface is 4.8 nm$^2$, and the total $\Sigma X_1 |X_2|$ of the products of the recess amount $X_1$ and the surface flatness dispersion $X_2$ of the air bearing surface is 12.6 nm$^2$, when subjected to F-test on a Wikls'$\Lambda$ obtained from the group of the magnetic head sliders having the air bearing surfaces having the characteristics.

In addition, the magnetic head slider is produced by polishing the air bearing surface for a polishing surface of a polishing surface plate being rotated while maintaining a relative angular relationship between the air bearing surface of the slider held on the work and the polishing surface.

The magnetic head slider is produced by a method in which the air bearing surface is processed by bringing a slider substrate into contact with the polishing surface of the polishing surface plate after rotating the polishing surface, and the processing of the air bearing surface is finished, i.e., the polishing surface plate is stopped by separating the air bearing surface away from the polishing surface while continuing the relative motion between the polishing surface and the air bearing surface.

BRIEF DESCRIPTION OF THE DRAWING

These and other features, objects and advantages of the present invention will become more apparent from the following description taken in conjunction with the accompanying drawings wherein:

FIG. 10 shows structural dimensions of the magnetic head slider for illustrating Example 2;

FIG. 11 shows structural dimensions of the magnetic head slider for comparison with Example 2;

FIG. 12 shows structural dimensions of the magnetic head slider for illustrating Example 3; and FIG. 13 shows structural dimensions of the magnetic head slider for comparison with Example 3.

DETAILED DESCRIPTION OF PREFERRED EMBODIMENTS

A first embodiment of the present invention will be described in detail below with reference to the drawings.

Figure 1:
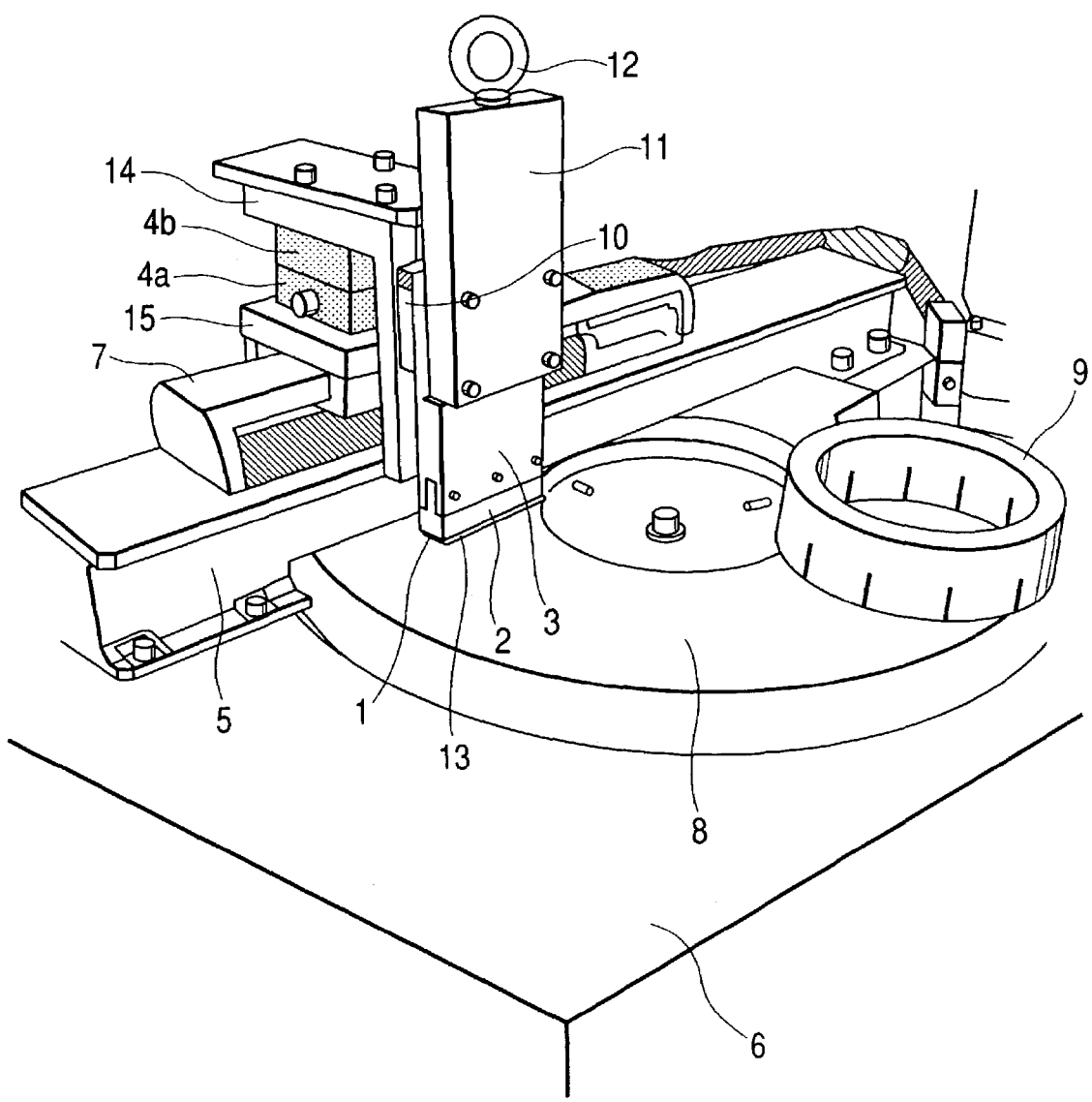
FIG. 1 is a general view for illustrating a polishing apparatus according to the present invention.

FIG. 1 is a general view of a polishing apparatus for illustrating the first embodiment. The polishing apparatus mainly includes a disk-shaped polishing surface plate (polishing surface plate 8) placed on a rotary table supported by a frame 6, a bridge 5 disposed on the frame in the form of spanning the surface plate, a linear actuator 7 which is a reciprocation-driving device mounted on the bridge, a workpiece holding device comprising a workpiece holding jig 2 mounted on a slider table of the reciprocation-driving device, a workpiece holding jig support plate 3 and the like, an angle adjusting mechanism 4a, 4b for adjusting the relative orientations of a workpiece surface to be polished of a workpiece 1 held by the work holding jig 2 located at a lower portion of the workpiece holding device and the polishing surface of the polishing surface plate 8, and a mechanism for adjusting the relative distance between the workpiece surface to be polished of the workpiece 1 and the surface plate polishing surface which is provided in the inside of the workpiece holding device.

Here, if it is difficult to measure the actual orientation of the work 1 during polishing, the angle adjustment of the relative orientations can be realized by adjusting the relative orientations and relative angle between the polishing surface of the polishing surface plate 8 and the workpiece-holding lower surface of the workpiece-holding jig 2. In the present embodiment, two gonio-stages 4a and 4b are used to constitute the angle adjusting mechanism.

The polishing surface plate 8 can be rotated horizontally relative to the surface of the rotary table by utilizing a motor (not shown) provided inside the rotary table and the like. The upper surface of the surface plate constituting the polishing surface is machined flat on a macroscopic basis, and is provided with a groove like a record disk groove having a width of several tens of μm and a depth of several μm on a microscopic basis. The groove promotes discharge of a lubricating liquid, whereby the sliding condition between the workpiece 1 and the polishing surface plate 8 is stabilized. At a projected portion of the groove, diamond abrasive grains with a diameter of about 100 nm are densely arranged in the state of being half-embedded by the procedure which will be described later, and, with this constitution, the surface plate functions as a polishing grindstone.

In addition, a lubricating liquid container and a lubricating liquid supply mechanism which are not shown are provided on the frame on a lateral side of the surface plate, and a lubricating liquid is dripped onto the polishing surface of the surface plate via a supply tube. Further, a ceramic-made correction ring 9 is disposed on the surface plate, and is supported by a freely rotatable pulley, whereby the correction ring 9 is rotated about its axis on the surface plate as the polishing surface plate 8 is rotated. With these arrangements, the flatness of the polishing surface of the surface plate is maintained, while the lubricating liquid dripped on the surface plate is spread uniformly.

On the other hand, on the frame, the bridge 5 with high stiffness is disposed in the form of spanning the polishing surface plate 8, and the actuator 7 of a ball screw type is fixed on the bridge 5. The ball screw is connected directly to a rotary motor, and a slider table 15 is attached to the ball screw. As the motor repeats forward rotation and reverse rotation, the slider table 15 can be linearly reciprocated on the bridge.

On the slider table 15, the two gonio-stages (cylindrical seats) 4a and 4b are disposed in two upper and lower stages so that the rotational axes of the gonio-stages are parallel to the polishing surface of the surface plate and the angle formed between the rotational axes is 90 degrees. The gonio-stages each have the function of varying the rotational orientation in the range of about ±15 degrees, so that the normal orientation of the workpiece surface to be polished of the workpiece 1 can be adjusted to all directions on a three-dimensional basis, and the normal axis matching (an operation for achieving parallelism) between the workpiece surface to be polished of the workpiece 1 and the polishing surface of the surface plate. After the adjustment, a relative orientation of the workpiece set arbitrarily relative to the polishing surface of the surface plate can be fixed by a lock device for the rotating mechanism of the gonio-stages 4a and 4b. In the case where the orientation is set to be substantially parallel, the substantially parallel condition can be fixed.

By arranging a direct-movement slide guide 10 vertically relative to the surface plate, only an additional polishing load on the workpiece 1 in a direction vertical to the polishing surface can be transmitted, and variation of the position of the contact surface between the workpiece 1 and the polishing surface plate 8 in a direction perpendicular to the surface of the surface plate due to the rotation of the surface plate and the reciprocating motion of the workpiece can be accommodated without any chattering in other directions. Therefore, the workpiece surface to be polished of the workpiece 1 and the surface of the polishing surface plate can be maintained substantially parallel even during swinging of the workpiece 1, and the substantially parallel condition can be maintained even at the time of inversion of the swing at which it is most difficult to maintain the parallel relationship.

The lower surface (the surface facing the surface plate) of the work holding jig 2 is brought into a mirror finished surface by lapping, and the flatness is precisely machined to 1 μm or less. A pressure adhesive elastic body 13 which is a pressure adhesive rubber-like elastic body having a thickness of about 2 mm is adhered to this surface, and, further, a magnetic head slider bar as the workpiece is adhered thereto. With such a rubber-like elastic body interposed, even where there is an abnormality in shape comprising a long-period undulation component in the longitudinal direction of the bar, the deformation is accommodated by an elastic deformation of the bar itself and a deformation of the rubber. As a result, there is obtained the effect that the work surface to be polished of the bar is brought into close and uniform contact with the polishing surface of the surface plate.

The rubber-like elastic body may not necessarily be pressure adhesive, and the workpiece 1 can be adhered or attached by other methods; these embodiments are all within the scope of the present invention. In addition, where the bar as the workpiece is free of longitudinal undulation or the like, the rubber-like elastic body may not necessarily be interposed.

In order to machine the slider bar as the workpiece by use of the polishing apparatus constituted as described above, it is important that the parallelism between the workpiece surface to be polished of the workpiece and the polishing surface of the polishing surface plate is precisely adjusted, that there is not chattering, that the stiffness is infinitively high, and that the parallelism between the workpiece surface and the polishing surface plate 8 adjusted before machining is not deteriorated due to polishing resistance generated during machining or the like.

As regards the precise adjustment of the parallelism, particularly for the adjustment of parallelism in the longitudinal direction of the work, a sheet-like pressure sensor (not shown) is interposed before the finish polishing step, and, while measuring the pressure distribution in the longitudinal direction on a real-time basis, the angle adjustment controls of the gonio-stages are turned to thereby contrive parallel contact between the workpiece surface to be polished of the workpiece 1 and the polishing surface of the surface plate. As regards the adjustment in the crosswise direction of the workpiece, also, the adjustment can be similarly conducted by use of the pressure sensor, and the parallelism between the workpiece surface to be polished of the workpiece 1 and the polishing surface of the polishing surface plate 8 can be adjusted with high precision and on a real-time basis by use of the two gonio-meters 4a and 4b. In addition, in place of the adjustment of the relative angle between the workpiece surface to be polished of the workpiece 1 and the polishing surface of the surface plate, the relative angle between the lower surface of the workpiece-holding jig and the polishing surface of the polishing surface plate 8 may be adjusted by the method using the pressure sensor.

On the other hand, as regards the stiffness, the dispersion of machining depth volume or the recess is increased if the stiffness is low in the direction of reciprocating motion and the rotating direction of the surface plate. This is probably due to that when the stiffness is low, the parallelism between the work surface and the polishing surface plate is deteriorated due to the polishing resistance generated during machining, so that the work surface cannot be machined uniformly. The stiffness in X direction and Y direction shown in the workpiece-holding jig 2 located at a position nearest to the machining point is not less than 0.2 N/µm.

The concrete contents about the polishing apparatus and the polishing method explained above are indicated by the U.S. application Ser. No. 10/024,962.

Now, specific examples will be described in detail below.

EXAMPLE 1

Specific conditions and the like under which a magnetoresistive effect head was produced as a trial by use of the polishing apparatus shown in FIG. 1 will be shown below.

A disk-shaped plate formed of a comparatively soft metal such as a tin alloy was used as the polishing surface plate 8. The plate was formed with a high-precision plain surface by machining on a machining apparatus for polishing or on a special different machining device. In this instance, to promote the discharge of a lubricating liquid during polishing or a sludge generated due to removal of material, a fine groove having a width of 30 µm and a depth of 10 µm were formed in the surface.

Next, while dripping a slurry liquid containing diamond abrasive grains with a grain size of about 100 nm onto the high-precision plain surface of the polishing surface plate 8 via a slurry supply tube, a weight of about 10 kgf was placed on a ceramic ring. Consequently, the flatness of the surface of the surface plate was further enhanced, and fixed abrasive grains such as the diamond abrasive grains were pressed into the surface of the surface plate through plastic deformation of the metallic material of the surface plate and were thereby held there.

Now, an air bearing surface of the magnetic head slider is polished by use of the polishing apparatus as described above. Before the specific description, the structure of the magnetic head slider which plays an important role in achieving a lower flying height will be briefly described.

Figure 2:
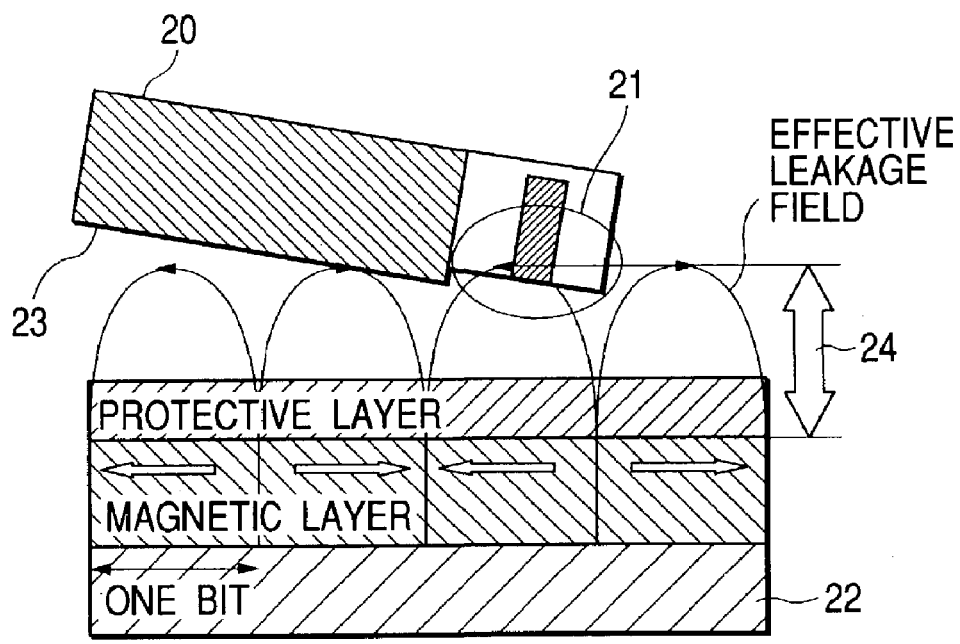
FIG. 2 is a schematic diagram for illustrating the magnetic spacing and the recess amount of a magnetic head slider.

FIG. 2 is a general diagram illustrating the relationship between the magnetic head slider 20 and a magnetic recording disk 22 and a sectional structure in the vicinity of the magnetic head element portion. The magnetic head element portion 21 is disposed in the range of an effective leakage field from the magnetic recording disk 22, whereby writing of information onto the magnetic recording disk 22 and reading of information from the magnetic recording disk 22 can be performed. The distance between the magnetic head element portion 21 and the surface of the magnetic recording disk 22 which enables the writing and reading of information is referred to as the so-called magnetic spacing 24, and it is possible to cope with a higher density magnetic recording as the magnetic spacing 24 is smaller.

On the other hand, considering the magnetic head slider 20, it is indispensable to precisely machine the air bearing surface 23 of the magnetic head slider 20. In this case, since the materials constituting the slider 20 and the magnetic head element portion 21 are different from each other, a step is necessarily generated between the polished surfaces of the two members. In FIG. 2, when the magnetic recording disk 22 and the magnetic head element portion 21 come close to each other, the physical spacing between their surfaces is called the flying height 37; for higher density recording, it is necessary to reduce the flying height 37 as much as possible and thereby to reduce the magnetic spacing 24.

Figure 3:
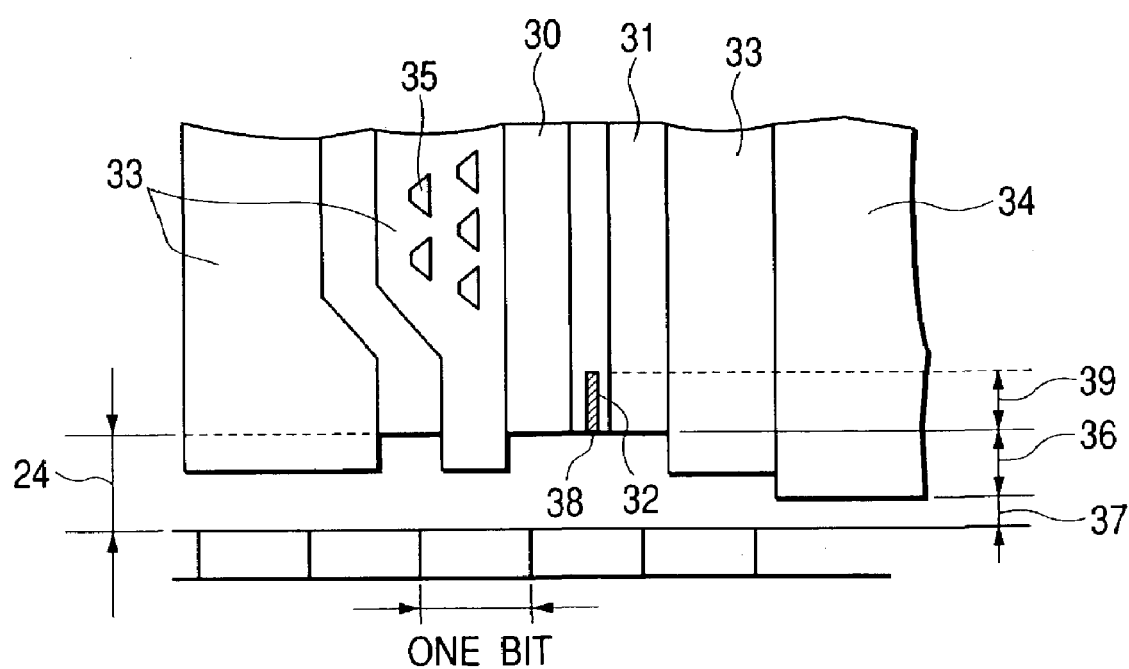
FIG. 3 is a schematic diagram for illustrating a sectional structure of a magnetic head element.

An enlarged view of the magnetic head element portion 21 is shown in FIG. 3. In order to reduce the magnetic spacing 24, it is important to reduce the interval 36 between an end portion 38 of a magnetoresistive element (a magnetic head element) (magnetic material) 32 constituting the magnetic head element portion (device portion) 21 and a slider substrate (aluminum titanium carbide, silicon carbide or the like) 34, i.e., the recess amount 36. In addition, it is important to reduce the dispersion of the recess amount 36 as much as possible when the high-density magnetic recording disk drives are put into practical use.

At the same time, in order to operate the magnetic recording disk drive stably, it is necessary for the magnetic head slider to fly up from the surface of the magnetic recording disk while constantly maintaining a stable posture. For the purpose of achieving this, it is important to reduce as much as possible the dispersion of flatness of the air bearing surface 23 of the magnetic head slider 20.

Incidentally, in the case where a protective layer (for example, a carbon layer) having a thickness of about several nm is formed on the air bearing surface or the surface of the magnetic head element, the recess amount between both of the members or the flatness of the air bearing surface may be similarly considered on the basis of the surface of the protective layer.

Moreover, 33 is an aluminium oxide insulating film and 35 is a coil for writing.

Figure 4:
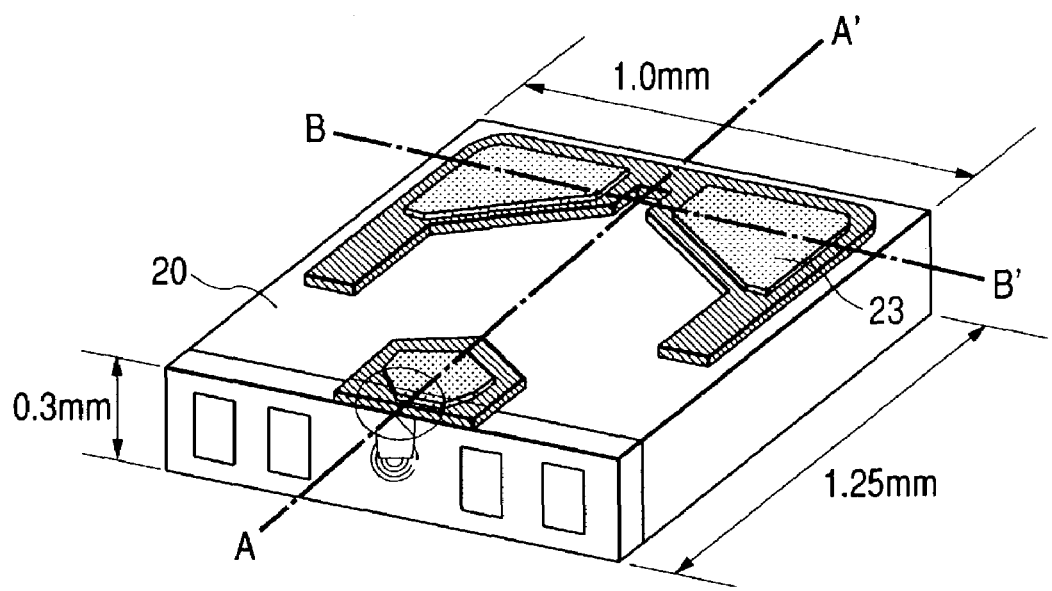
FIG. 4 is a schematic diagram for illustrating an air bearing surface of the magnetic head slider.

Next, the air bearing surface which greatly influences the magnetic characteristics will be described. FIG. 4 is a perspective view of the magnetic head slider 20 as viewed from the side facing the magnetic recording disk 22. As shown in FIG. 4, the air bearing surface 23 is projected in shape with respect to the moving direction (direction A; the direction in which an airflow is generated) of the magnetic head slider 20 (clearly shown in the figure), and the amount of bend is called "crown". The air bearing surface 23 is projected in shape also in a direction orthogonal to the moving direction, and the amount of bend is called "camber".

Figure 5A:
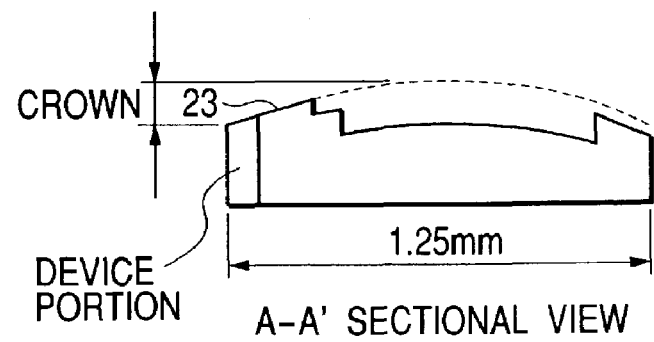
FIGS. 5A and 5B are a schematic diagram for illustrating the crown and the camber in the air bearing surface.
Figure 5B:
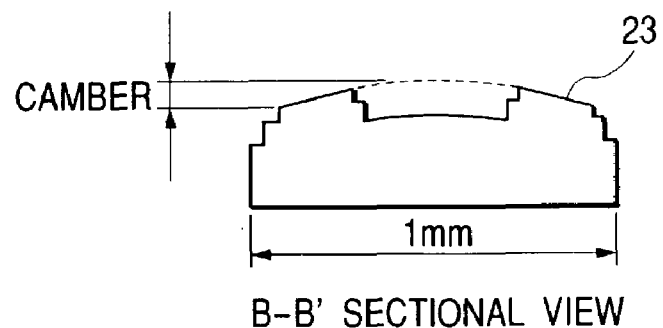

FIG. 5 is a diagram for illustrating FIG. 4, in which FIG. 5A is a sectional view taken along line A–A' of FIG. 4, showing the crown of the air bearing surface, and FIG. 5B is a sectional view taken along line B–B' of FIG. 4, showing the camber of the air bearing surface. Both the crown and the camber are parameters necessary for stable flying-up of the magnetic head slider. As the dispersion of surface flatness of the air bearing surface is smaller, it is possible to provide a magnetic head slider having higher reliability, i.e., higher quality capable of obtaining equal characteristics.

Taking into account the various problems required for formation of the air bearing surface of the magnetic head slider, the air bearing surface of the magnetic head slider was machined by use of the above-mentioned polishing apparatus, and the condition of the thus machined air bearing surface was evaluated. One of the characteristics evaluated was the flatness of the air bearing surface, which was measured by HD3300, an optical shape measuring apparatus produced by WYKO Inc. In this instance, the differential between the measured value and the designed value was deemed as the dispersion of flatness.

Height distribution in the range of about 50 µm$^2$ including an upper shield portion 30, a lower shield portion 31 and a read head (a MR or GMR head) 32, and a slider substrate 34 of the magnetic head was measured by use of Manoscope III, an atomic force microscope (AFM) produced by Digital Instruments, and the recess amount 36 was defined as the differential between the mean height inclusive of the upper and lower shield portions 30, 31 and the mean height of the slider substrate portion 34.

The product is machined with a certain dispersion, with respect to a specification value of flatness and a specification value of recess. Therefore, the width of dispersion differs depending on the machining method, and a machining method leading to a smaller dispersion width can be judged as a preferable machining method from the viewpoint of a higher production yield.

Figure 6:
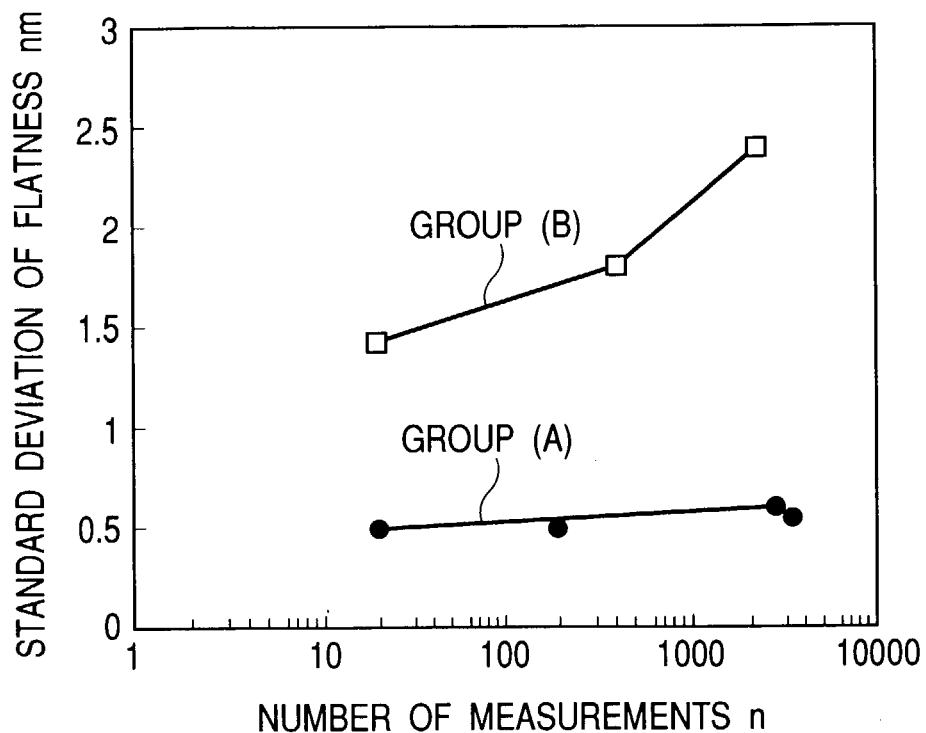
FIG. 6 is a diagram showing the relationship between the flatness (standard deviation) of the air bearing surface and the number of measurement pieces.

In FIG. 6, the relationship between the dispersion (standard deviation) of the flatness of the air bearing surface of the magnetic head element portion produced by the polishing apparatus shown in FIG. 1 from the designed value and the number of the magnetic head sliders that are measured is shown as Group (A). In the figure, as a comparative example, the case of polishing the air bearing surface by a computer lapping machine (for example, Robo 4, a product by Advanced Imaging Inc.), which is a polishing method conventionally used, is shown as Group (B).

Magnetic head sliders differing in production lot and having a quality enough to be a product were extracted at random as specimens to be used. Here, the magnetic head slider capable of becoming a product means a magnetic head slider such that when the magnetic head slider is combined with a magnetic recording disk to constitute a magnetic recording disk drive, the magnetic recording disk drive can normally operates at a level required for the social needs at present and can sufficiently display the characteristics thereof.

Therefore, the magnetic head sliders capable of becoming a product include not only the magnetic head sliders manufactured by the above-mentioned manufacturing method but also those magnetic head sliders which have been shipped as products after being selected from the magnetic head sliders manufactured. As is clear from the results, by individually polishing the air bearing surfaces of the magnetic head sliders by use of the polishing apparatus shown in FIG. 1 (Group (A)), the standard deviation of the flatness is substantially constant, independent of the machining volume (the number of measurement sliders). In other words, the results show that it is possible to provide magnetic head sliders uniform in quality, extremely stably.

Incidentally, in the case of a computer lapping method (a bar-like magnetic head slider in which 20 to 40 magnetic head sliders are arranged in a row is used) according to the prior art, the flatness of each of the elements (devices) is largely different from the designed specification even when the magnetic head sliders are polished under the same conditions, and the dispersion of flatness of the air bearing surface increases as the number of elements (devices) polished increases. This means that some selection is necessarily required for supplying magnetic head sliders uniform in quality.

Figure 7:
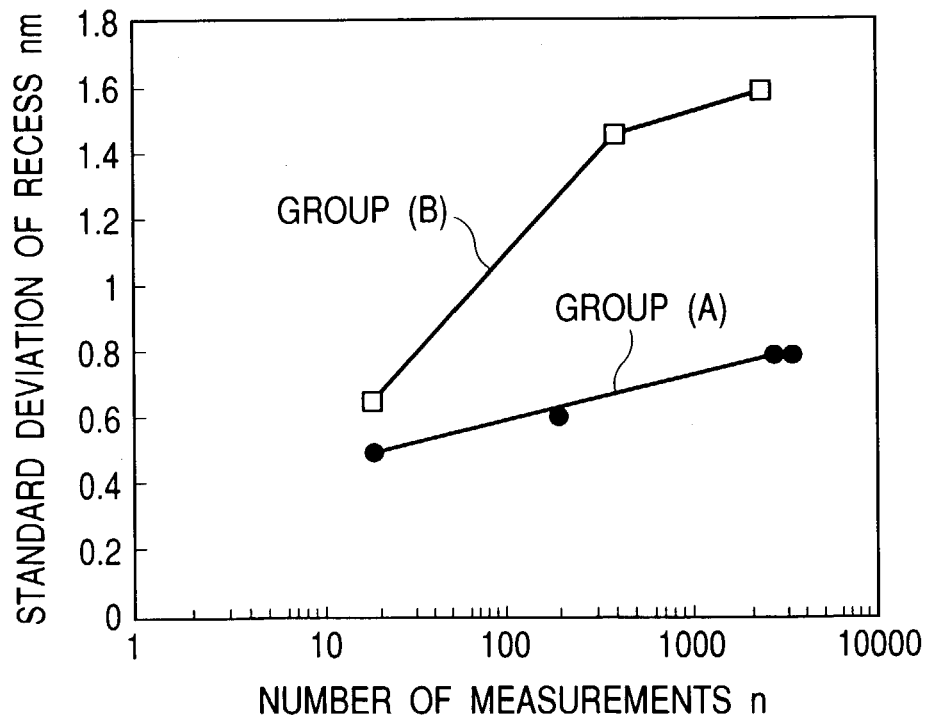
FIG. 7 is a diagram showing the relationship between the recess amount (standard deviation) of the air bearing surface and the number of measurement pieces.

Similarly, in FIG. 7, the relationship between the dispersion (standard deviation) of the recess amount 36 in the air bearing surface of the magnetic head element (device portion) from the designed value and the number of measurement sliders is shown as Group (A). In addition, Group (B) in the figure is a comparative example, showing the case where the bar-like magnetic head slider was machined by a computer lapping machine according to the prior art. The specimens evaluated and the evaluation method are the same as in the case of FIG. 6.

As is clear from the results shown in FIG. 7, in the range where the number of pieces polished (the number of measurement sliders) is small, the dispersion of recess amount of the air bearing surface is substantially the same, irrespective of whether the magnetic head sliders are machined individually or they are machined simultaneously by arranging them in a bar form. However, as the number of pieces polished increases, the dispersion of the recess amount in the prior-art polishing method (Group (B)) increases conspicuously. It is clear that, according to the polishing method shown in FIG. 1 (Group (A)), the increase in the recess amount dispersion can be suppressed to a comparatively small level.

Figure 8:
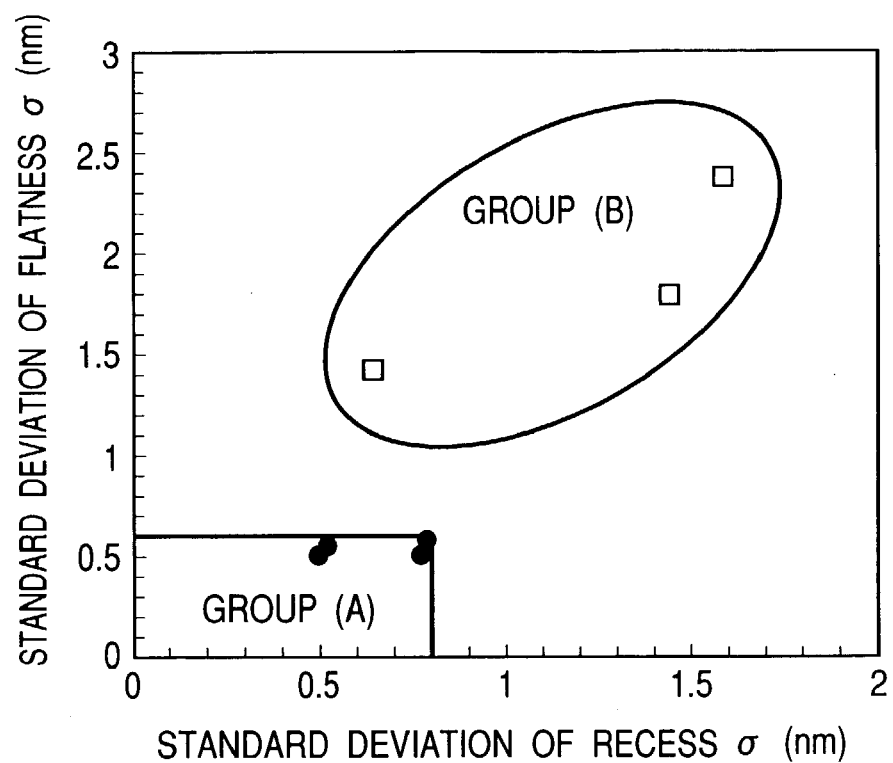
FIG. 8 is a diagram for illustrating the relationship between the flatness dispersion and the recess amount of the magnetic head slider.

FIG. 8 shows the relationship between the flatness dispersion (standard deviation) and the recess dispersion (standard deviation), evaluated by varying the number of measurement pieces. It is clear from the diagram that, by individually polishing the air bearing surfaces of the magnetic head sliders (see FIG. 1), the conditions of the air bearing surfaces of the magnetic head sliders obtained, i.e., the dispersions (standard deviations) of the flatness and the recess amount of the air bearing surface required for realization of high density recording can be controlled to within the ranges of not more than 0.6 nm and not more than 0.8 nm, respectively.

Meanwhile, it is seen that in the case of Group (B) shown in FIG. 8, the dispersions (standard deviations) of both the flatness and the recess amount of the air bearing surface are distributed over wide ranges. In the case of using the magnetic head sliders having these specifications as the magnetic head slider for high-density recording, uniformization of the specifications by some selection means is required.

Figure 9:
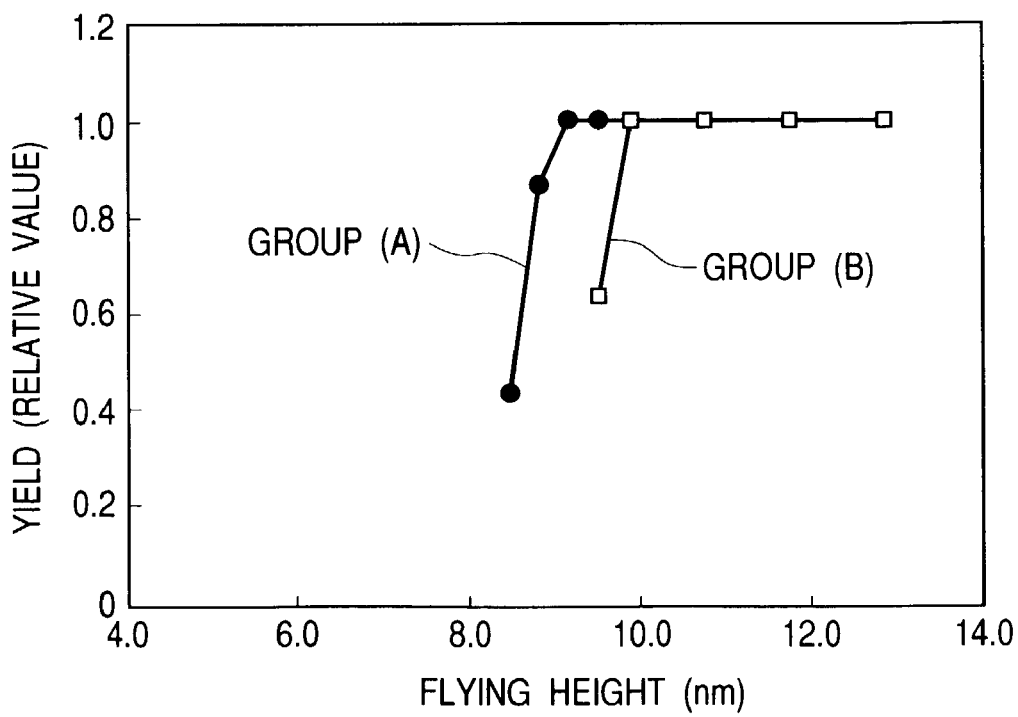
FIG. 9 is a diagram for illustrating the flying characteristics in Example 1.

FIG. 9 shows the measurements of flying-up characteristics of the head, for the two groups mentioned above. The test method used is such that in the condition where the magnetic head belonging to each of the groups is incorporated in a hard disk drive, the flying height 37 between the head and the disk is reduced by a method of decompressing the inside of the hard disk drive, and, while monitoring the output of the head during the test, the lower flying height limit in each group, i.e., the minimum flying height for obtaining normal magnetic characteristics without contact between the air bearing surface of the magnetic head slider and the magnetic recording disk is quantified.

Incidentally, the yield on the axis of ordinates is shown through comparison with the case of a standard flying height of 13 nm for the magnetic recording disk drives at present, and a low yield means that normal characteristics cannot be displayed due to the contact between the head and the disk.

Consequently, as is clear from FIG. 9, it is seen that Group (A) retains good characteristics as a magnetic head even at a flying height of not more than 10 nm. It is also seen that Group (B) cannot secure reliability as a magnetic head since the head deteriorated in characteristics is exposed at a flying height of not more than 10 nm. Therefore, the shape of the air bearing surface obtained by the above-mentioned polishing method is important in the same manner as the polishing method, and the magnetic head group (Group (A)) constituted of the flatness dispersion and the recess dispersion illustrated in FIGS. 6 to 8 can realize not only the flying height of 13 nm at present but also a further lower flying height of the magnetic head.

Besides, in the case where the machined step of the air bearing surface is small, the adhesion property of the protective layer formed thereafter on the air bearing surface is enhanced, so that the thickness of the protective layer can be further reduced, and the magnetic spacing 24 affecting the important characteristics of the magnetic recording disk drive can be reduced, in other words, higher-density recording and reproduction can be achieved. Incidentally, the magnetic head slider group belonging to Group (A) showed an enhancement of 2 to 5% in resolution of the reading element for the same flying height, as compared with Group (B).

EXAMPLE 2

From the results shown in FIGS. 6 and 7, the magnetic head group determined by the flatness dispersion and the recess amount dispersion in the shape of the air bearing surface of the magnetic head can be judged whether they have been manufactured by the same machining method or machining standard (machining specifications), without acquiring several thousands of pieces of data. The judging method will be described below.

Five magnetic head sliders per lot and a total of 20 magnetic head sliders were selected at random from the magnetic head sliders which had been produced by the above-mentioned polishing apparatus and method shown in FIG. 1, in different production lots, and which had a quality good enough to be a product, and the 20 magnetic head sliders are measured for the shape of the air bearing surface. The results are shown in FIG. 10.

Here, the magnetic head slider good enough to be a product means a magnetic head slider such that when it is combined with a magnetic recording disk to constitute a magnetic recording disk drive, the magnetic recording disk drive can normally operate at a level required by the social needs at present and can sufficiently display the characteristics thereof. Therefore, the magnetic head sliders good enough to be a product include not only the magnetic head sliders manufactured by the above-mentioned manufacturing method but also the magnetic head sliders shipped as products after being selected from the manufactured magnetic head sliders. In addition, the definitions of the flatness and the recess amount of the air bearing surface and the measuring method are the same as in Example 1.

As is clear from FIG. 10, the magnetic head sliders polished by the above-mentioned polishing apparatus constitute a magnetic head slider group such that the standard deviation of the recess $X_1$ between the slider substrate and the magnetic head element (device portion) disposed via the shield portion is 0.5 nm, and the standard deviation of the dispersion $X_2$ of the surface flatness of the air bearing surface is 0.5 nm (hereinafter this population will be referred to simply as Group ($A_1$)).

As a polishing method generally used in the prior art as a comparative example, air bearing surfaces were polished by use of the above-mentioned computer lapping machine (for example, Robo 4, a product by Advanced Imaging Inc.), and extraction of specimens and measurement were conducted in the same manner as above. The results are shown in FIG. 11. According to the results, the magnetic head sliders thus obtained constitute a magnetic head slider group such that the standard deviation of the recess amount $X_3$ between the slider substrate and the magnetic head element (device portion) disposed via the shield portion is 0.64 nm, and the standard deviation of the dispersion $X_4$ of the surface flatness of the air bearing surface is 1.42 nm (hereinafter, this population will be referred to simply as Group ($B_1$)).

In the case where the number of pieces constituting the population is as small as 20 and Groups ($A_1$) and ($B_1$) differ from each other in standard deviations of both the flatness and the recess amount, it is statistically examined whether these groups constitute the same population when the number of pieces is increased. Specifically, by use of Wilks'Λ with the two populations as objects, a test of the hypothesis H that "there is no statistical significance between the populations of Group ($A_1$) and Group ($B_1$)" is conducted.

Based on the measurement results shown in FIGS. 10 and 11, the following test is conducted. That is to say, for the population (Group ($A_1$)) with a number of samples of 20 such that the total $\Sigma X_1$ of the recess amounts $X_1$ is 30.5 nm, the total $\Sigma X_1^2$ of squares of the recess amounts $X_1$ is 51 nm$^2$, the total $\Sigma X_2$ of the dispersions $X_2$ of surface flatness of the air bearing surface is −1 nm, the total $\Sigma X_2^2$ of squares of the dispersions $X_2$ is 4.8 nm$^2$, and the total $\Sigma X_1 X_2$ of the products of the recess amount $X_1$ and the dispersion $X_2$ of the surface flatness of the air bearing surface is −0.95 nm$^2$ and the population (Group ($B_1$)) with a number of samples of 20 such that the total $\Sigma X_3$ of the recess amounts $X_3$ is 55.1 nm, the total $\Sigma X_3^2$ of squares of the recess amounts $X_3$ is 159.4 nm$^2$, the total $\Sigma X_4$ of the dispersions $X_4$ of the surface flatness of the air bearing surface is 2.1 nm, the total $\Sigma X_4^2$ of squares of the dispersions $X_4$ is 38.6 nm$^2$, and the total $\Sigma X_3 X_4$ of the products of the recess $X_3$ and the dispersion $X_4$ of the surface flatness is 5.15 nm$^2$, the Wilks'Λ is determined, and F-test is conducted with a level of significance of 5%.

The Wilks'Λ can be determined as follows. That is, the Wilks'Λ can be determined as:

$$\Lambda = |W|/|T|$$

constituted of the determinant |W| of a within groups matrix of sums of squares and cross-products, W, obtained by the total, the sum of squares sum and the sum of products of each term:

$$|W| = (W_{11} \times W_{22} - W_{12}^2)$$

and the determinant |T| of a total matrix of sums of squares and cross-products, T:

$$|T| = (T_{11} \times T_{22} - T_{12}^2).$$

Thus, in the case of the above-mentioned magnetic head sliders, Λ=|W|/|T|=0.453.

In addition, the test statistic $F_\Lambda$ corresponding to the Λ statistic is represented by the following formula:

$$F_\Lambda = ((N1+N2-3)/2) \times ((1-\Lambda)/\Lambda) = 22.2.$$

When the level of significance 0.05 is determined, and this is compared with the statistic $$F_0 = F_{(2, N1+N2-3)}(0.05),$$

$F_\Lambda = 22.3 \geq F_{(2, N1+N2-3)}(0.05) = 3.23$, and, therefore, the hypothesis H is rejected, and it can be judged that there is a statistical significance between the two Groups ($A_1$) and ($B_1$).

As has been described above, the group of the magnetic head sliders, each having air bearing surface, such that the standard deviation of the group for the recess amount is not more than 0.8 nm and the standard deviation of the group for the flatness dispersion of the air bearing surfaces is not more than 0.6 nm, as shown in FIG. 8, upon measurement of the recess amount and the surface flatness of the air bearing surface of the magnetic head sliders extracted arbitrarily, which are quantities capable of being statistically processed, belong statistically to Group (A) and can be judged as magnetic head sliders having substantially the same air bearing surface shape as the magnetic head sliders constituting Group (A), as verified above.

EXAMPLE 3

Next, another method of discriminating Group ($A_1$) from Group ($B_1$) described in Example 2 will be described.

As regards the shapes of the air bearing surfaces of five per lot and a total of 20 magnetic head sliders extracted at random from the magnetic head sliders differing in production lots and capable of becoming a product of each of Group ($A_1$) and Group ($B_1$) obtained in Example 2, the flatness dispersion of the air bearing surfaces is treated as the absolute value $|X_2|$ thereof.

FIG. 12 shows the case of evaluation of the flatness dispersion of the air bearing surfaces as the absolute value $|X_2|$ thereof for the data on Group ($A_1$), which is defined as Group (C). FIG. 13 shows the case of evaluation of the flatness dispersion of the air bearing surfaces as the absolute value $|X_4|$ thereof for the data on Group ($B_1$), which is defined as Group (D). In the same manner as in Example 2, for Group (C) and (D), statistical processing was conducted by use of numerical values shown in FIGS. 12 and 13.

As a result, $\Lambda=|W|/|T|=0.382$, and, as compared with a statistic $F_0=F_{(2,N1+N2-3)}(0.05)$ with a level of significance of 0.05, $F_A=29.9 \geq F_{(2,N1+N2-3)}(0.05)=3.23$, which leads to the resultant conclusion that there is a significant difference between Group (C) and Group (D).

As has been described above, the group of the magnetic head sliders, each having the air bearing surface, such that the standard deviation of the recess amount is not more than 0.8 nm and a standard deviation of the flatness dispersion of the air bearing surface is not more than 0.6 nm, upon measurement of the recess amount and the surface flatness of the air bearing surface of magnetic head sliders selected arbitrarily, which are quantities capable of being statistically processed, belong statistically to Group (C) and can be judged as magnetic head sliders having substantially the same air bearing surface shape as the magnetic head sliders constituting Group (C).

As has been described above, by measuring the recess amount and the surface flatness of the air bearing surface of magnetic head sliders extracted arbitrarily, which are quantities capable of being statistically processed, and controlling the dispersion of the recess amount and the dispersion of the surface flatness of the air bearing surface, it is possible to efficiently manufacture magnetic head sliders capable of coping with a lowering of the flying height.

While we have shown and described several embodiments in accordance with our invention, it should be understood that disclosed embodiments are susceptible to changes and modifications without departing from the scope of the invention. Therefore, we do not intend to be bound by the details shown and described herein but intend to cover all such changes and modifications as fall within the ambit of the appended claims.

We claim:

1. A method of manufacturing a magnetic head slider comprising a magnetic head element that is disposed on a slider substrate having an air bearing surface with an insulating film and a shield portion interposed therebetween, wherein said air bearing surface of said slider held on a workpiece-holding unit is polished by a polished surface of a polishing surface plate being rotated while controlling a relative angular relationship between said air bearing surface and said polishing surface during polishing such that the standard deviation for a recess amount $X_1$ between the air bearing surface and a surface of the magnetic head element is not more than 0.8 nm and the standard deviation for the dispersion $X_2$ of a surface flatness of the air bearing surface is not more than 0.6 nm.

2. A method of manufacturing a magnetic head slider as set forth in claim 1, wherein the relative angular relationship between said air bearing surface and said polishing surface is a substantially parallel relationship.

3. A method of manufacturing a magnetic head slider as set forth in claim 1, wherein the polishing of said air bearing surface is conducted by relatively moving said polishing surface of said polishing surface plate and said air bearing surface.

4. A method of manufacturing a magnetic head slider as set forth in claim 1, wherein the polishing of said air bearing surface is finished by stopping the rotation of said polishing surface plate after separating said air bearing surface away from said polishing surface of said polishing surface plate.

* * * * *